United States Patent [19]
Krude

[11] Patent Number: 6,071,195
[45] Date of Patent: Jun. 6, 2000

[54] CONSTANT VELOCITY UNIVERSAL BALL JOINT

[75] Inventor: Werner Krude, Neunkirchen, Germany

[73] Assignee: GKN Automotive AG, Lohmar, Germany

[21] Appl. No.: 09/019,903

[22] Filed: Feb. 6, 1998

[30] Foreign Application Priority Data

Feb. 8, 1997 [DE] Germany ............................ 197 04 761

[51] Int. Cl.[7] ...................................................... F16D 3/16
[52] U.S. Cl. ............................ 464/144; 464/145; 464/906
[58] Field of Search ..................................... 464/143, 144, 464/145, 146, 906

[56] References Cited

U.S. PATENT DOCUMENTS

| | | | |
|---|---|---|---|
| 2,322,570 | 6/1943 | Dodge ...................................... | 464/144 |
| 3,071,944 | 1/1963 | Mazziotti et al. ....................... | 464/144 |
| 3,370,441 | 2/1968 | Aucktor .................................. | 464/144 |
| 3,928,985 | 12/1975 | Girguis ................................... | 464/146 |
| 4,678,453 | 7/1987 | Aucktor et al. ..................... | 464/144 X |
| 4,995,853 | 2/1991 | Schwarzler et al. ................ | 464/144 X |
| 5,531,643 | 7/1996 | Welschof ............................. | 464/144 X |
| 5,813,917 | 9/1998 | Wakamatsu et al. ............... | 464/140 X |

FOREIGN PATENT DOCUMENTS

| | | | |
|---|---|---|---|
| 1353407 | 1/1964 | France .................................... | 464/146 |
| 2419236 | of 0000 | Germany . | |
| 2461298 | of 0000 | Germany . | |
| 405231435 | 9/1993 | Japan ..................................... | 464/144 |

OTHER PUBLICATIONS

Design Abstracts; "Constant–Velocity Universal Ball Joints"; Author: Fred F. Miller, Manager of Engineering, Universal Joint Product; Apr. 19, 1965.

*Primary Examiner*—Lynne H. Browne
*Assistant Examiner*—Brian H. Buck

[57] ABSTRACT

A constant velocity universal ball joint in the form of a plunging joint has an outer joint part provided with outer ball tracks which extend at a first angle of intersection $+\gamma_t$ relative to the longitudinal axis $A_a$ of the outer joint part. An inner joint part is provided with inner ball tracks which extend at a second angle of intersection $-\gamma_t$ relative to the longitudinal axis $A_i$ of the inner joint part. Torque transmitting balls are guided in outer and inner ball tracks associated with one another in pairs, with the angles of intersection $+\gamma_t$, $-\gamma_t$ of tracks associated with one another in pairs relative to the longitudinal axes $A_a$, $A_i$ of the respective joint part being of identical size and being set in opposite senses. A ball cage is positioned between the outer joint part and the inner joint part, and has circumferentially distributed cage windows holding the balls in a common plane. Each two circumferentially adjoining ball tracks in the outer joint part comprise center lines B which extend parallel relative to one another and are positioned in one plane and form outer pairs of tracks, and each two circumferentially adjoining ball tracks in the inner joint part comprise center lines C which extend parallel relative to one another and are positioned in one plane and form inner pairs of tracks.

11 Claims, 6 Drawing Sheets

CONSTANT VELOCITY UNIVERSAL BALL JOINT

BACKGROUND OF THE INVENTION

The invention relates to a constant velocity universal ball joint in the form of a plunging joint having an outer joint part to be connected to a first drive part. The first drive part is provided with an inner aperture in which there are formed outer ball tracks which extend at a first angle of intersection relative to the longitudinal axis $A_a$ of the outer joint part. An inner joint part to be connected to a second drive part forms a hub member which is positioned in the inner aperture of the outer joint part and on which there are formed inner ball tracks which extend at a second angle of intersection relative to the longitudinal axis $A_i$ of the inner joint part. Torque transmitting balls are guided in outer and inner ball tracks associated with one another in pairs, with the angles of intersection of tracks associated with one another in pairs being identical in size and set in opposite senses relative to the longitudinal axis. A ball-cage is arranged between the outer joint part and inner joint part and comprises circumferentially distributed cage windows in which the balls are held in a common plane and in which, when the joint is articulated, the balls are guided onto an angle-bisecting plane between the intersecting longitudinal axes $A_a$, $A_i$ of the outer joint part and of the inner joint part.

Joints of this type are known as VL plunging joints and are described in DE-PS 12 32 411, DE 31 02 871 C2 or DE 36 17 491 A1, for example. In these joints, the balls are controlled directly by the intersecting ball tracks, with the control action referring both to the balls and thus the cage being guided onto the angle-bisecting plane in case of articulation of the joint and to the balls and thus the cage being guided to half the relative plunging path between the outer joint part and the inner joint part when an axial displacement takes place. The maximum amount of axial displacement can be determined by inner stops for the inner joint part provided at the ball cage. The outer joint part is normally provided along its entire length with an internally cylindrical guiding face for the ball cage.

Joints of the prior art type have disadvantages in that the maximum possible articulation angles and the maximum possible plunging distances limit one another. This is so because both in the case of an axial displacement and in the case of a joint articulation, the balls are displaced from their central neutral positions in the circumferentially extending cage windows towards the ends of same against which they eventually stop. If, for example, as a result of an axial displacement, the balls are already displaced within their respective cage windows towards one end and if, in addition, the joint is articulated, there occurs a further oscillating movement in the cage windows around the neutral position which is now displaced, so that in the case of a relatively small articulation angle in addition part of the balls reach an end position in the respective cage windows.

It is therefore the object of the present invention to provide a joint which permits improved values in respect of the maximum plunge and the maximum articulation angle.

SUMMARY OF THE INVENTION

The objective is achieved in that each two circumferentially adjoining ball tracks in the outer joint part comprise center lines which extend parallel relative to one another in one plane and which form outer pairs of tracks, and in that each two circumferentially adjoining ball tracks in the inner joint part comprise center lines which extend parallel relative to one another in one plane and which form inner pairs of tracks wherein the respective outer and inner pairs of tracks are associated with one another and jointly receive a pair of balls.

The arrangement in accordance with the invention permits two ball tracks each in the inner joint part and in the outer joint part to be positioned relatively close together. Thus, with a predetermined number of balls in those positions where in one joint part two tracks extending at opposed angles of intersection $+\gamma_t$, $-\gamma_t$ relative to the longitudinal axes $A_a$, $A_i$ adjoin one another, the cage windows can be relatively long in the circumferential direction, without the remaining width of the webs between the lengthened cage windows becoming impermissibly small.

According to a preferred embodiment it is proposed that the ball cage comprises one common cage window for each pair of balls, which pair of balls is guided in outer and inner pairs of tracks associated with one another. In this way, particular advantage is taken of the invention in that in the case of extreme articulation angles or extreme plunging distances, the balls of the pairs of tracks are able to enter window regions which are normally occupied by a separating web between two windows. The window regions of the pairs of balls of the track pairs thus merge to form one single cage window, so that certain window regions can be alternately occupied by both balls of one pair.

The inventive joints are also advantageous from a production point of view because at least each two adjoining parallel ball tracks of a pair of tracks can be produced by suitable tools in one operation. In one embodiment which is functionally advantageous in respect of controlling the balls, it is proposed that there is provided an even number of outer and inner pairs of tracks and that the center lines of outer pairs of tracks and of inner pairs of tracks, which, with reference to the longitudinal axes $A_a$, $A_i$ of one of the joint parts each are positioned radially opposite one another, form an angle of intersection $2\gamma_t$ with one another.

In one embodiment which is particularly advantageous from a production point of view, it is proposed that there is provided an even number of outer and inner pairs of tracks and that the center lines of outer pairs of tracks and of inner pairs of tracks, which are positioned radially opposite one another with reference to the longitudinal axes $A_a$, $A_i$ of one of the joint parts, extend parallel relative to one another. In this way it is possible to machine four ball tracks, i.e. the tracks of two pairs of tracks positioned radially opposite in one joint part, in one single production step.

According to a preferred embodiment it is proposed that the planes defined by the center lines of the respective ball tracks of each pair of tracks extend parallel to the longitudinal axes $A_a$, $A_i$ of the respective joint parts and that the planes of the associated pairs of tracks in the outer part and inner part coincide. In this way there is achieved a design which is relatively similar to prior art VL joints in that the tracks along the length of the joint parts substantially (though not in the strict sense of the word) comprise a constant depth.

According to a further advantageous embodiment, it is proposed that the planes defined by the center lines of the respective ball tracks of each pair of tracks form an opening angle $\gamma_n$ relative to the longitudinal axes $A_a$, $A_i$ of the respective joint part, with the planes of the associated pairs of tracks in the inner joint part and in the outer joint part forming opening angles $+\gamma_n$, $-\gamma_n$, relative to the longitudinal axes $A_a$, $A_i$, which angles are of identical size, but are set in opposite senses.

By varying the track depth along the axial length of the joint part, with the track depths of associated tracks jointly forming a mouth-like opening of the tracks, an additional control angle part is obtained, the advantage being that the standard angle of intersection $\gamma_t$ relative to the longitudinal axis in a radial view can be reduced in size. This means that the circumferential displacement of the balls in the windows in the case of an axial displacement of the joint or joint articulation is reduced by a predetermined amount, i.e. the balls stop against the ends of the cage windows at a later stage, thus permitting greater axial displacement paths and greater axial articulation angles.

According to a first embodiment of the tracks with variable depths there is provided an even number of outer and inner pairs of tracks. Also, the planes through the outer pairs of tracks and inner pairs of tracks which, with reference to the respective longitudinal axes $A_a$, $A_i$, are positioned radially opposite one another, form an opening angle $2\gamma_n$ with one another, thereby achieving an embodiment which is functionally advantageous with reference to the control of the balls and which also leads to symmetric strength conditions of the joint parts.

According to a second embodiment of the tracks with variable depths it is proposed that there is provided an even number of outer and inner track pairs and that the planes through the outer track pairs and inner tracks pairs which, with reference to the respective longitudinal axes $A_a$, $A_i$, are positioned radially opposite one another, extend parallel relative to one another. This is advantageous from a production point of view in that, again, tracks positioned radially opposite one another in one joint part can be produced jointly in the respective machining operations.

According to a preferred embodiment, the angles of intersection $+\gamma_t$, $-\gamma_t$ range between 10° and 15°, i.e. especially they are smaller than those in standard VL constant velocity universal joints.

With an angle of intersection $\gamma_t \geq 12°$, the cage preferably comprises one common cage window for the two balls of each pair of tracks.

The opening angles $+\gamma_n$, $-\gamma_n$ preferably range between 4° and 8°.

BRIEF DESCRIPTION OF THE DRAWINGS

Further preferred embodiments are obtained from the drawings wherein

FIG. 2c is a cross-section through the cage of the joint along line 2c—2c according to FIG. 2a.

DETAILED DESCRIPTION

Figure 1A:
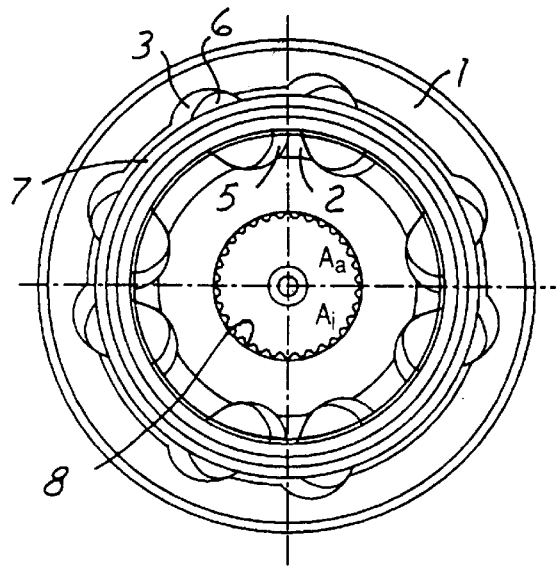
FIG. 1a is an axial view of a joint in accordance with the invention.
Figure 1B:
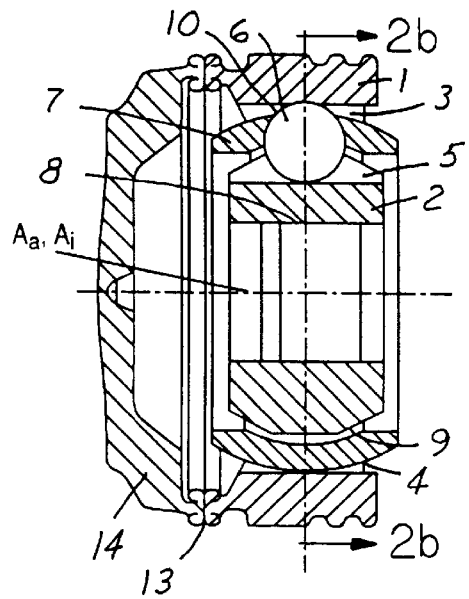
FIG. 1b is an axial section of the joint according to FIG. 1.

Below, FIGS. 1a and 1b will be described jointly. They show an annular outer joint part 1 with a cylindrical inner face 4 and outer ball tracks 3, as well as an annular inner joint part 2 with an outer face 9 and inner ball tracks 5. A ball 6 is guided in the associated inner and outer ball tracks 3, 5. The longitudinal section shows the center lines B, C of the outer and inner ball tracks, which center lines B, C extend parallel to the longitudinal axes $A_a$, $A_i$, which are positioned in planes extending parallel to the longitudinal axes $A_a$, $A_i$, but which form an angle of intersection relative to the respective longitudinal axes $A_a$, $A_i$. As can be seen in this view, each two parallel ball tracks form identical angles of inclination. The balls are held in a ball cage 7 in circumferentially distributed cage windows 10. A base part 14 is connected by a friction weld 13 to the outer joint part 1. The inner joint part 2 comprises an inner aperture 8 for inserting a plug-in shaft.

Figure 2A:
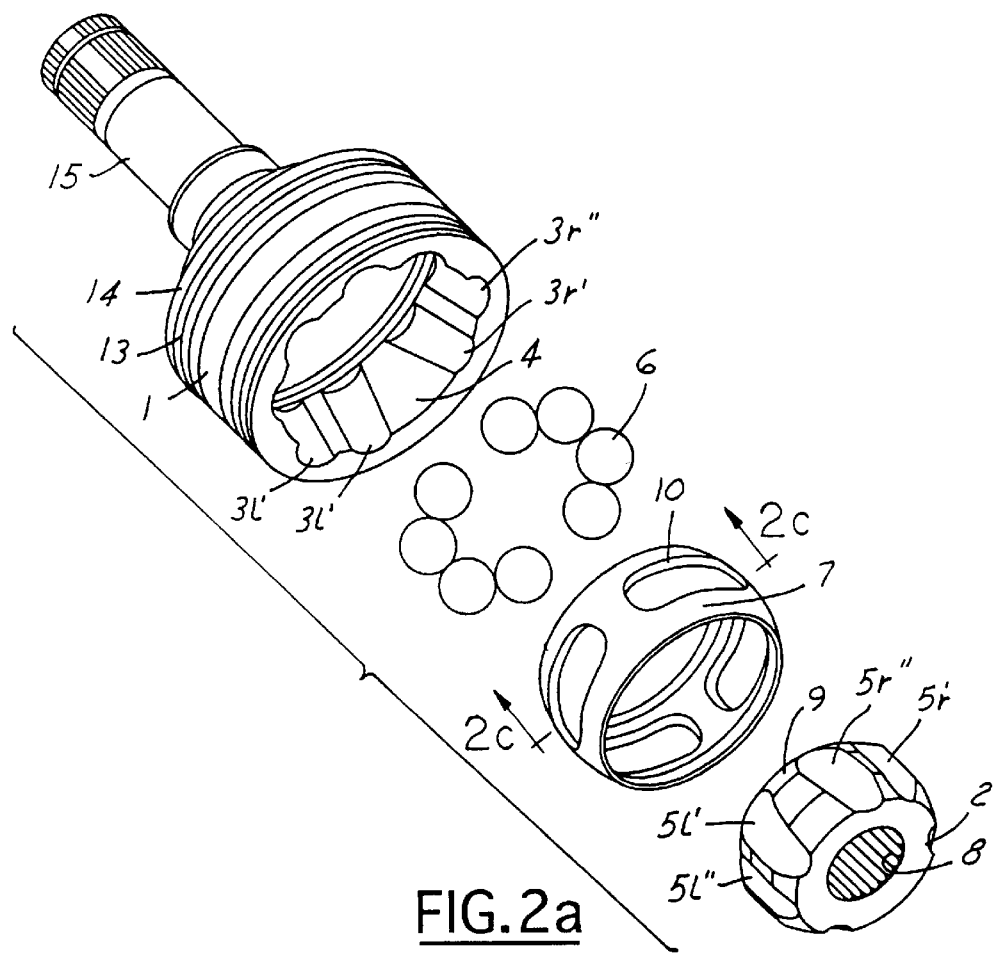
FIG. 2a is an exploded view of an inventive joint.

The joint shown in FIG. 2a in the form of an inclined exploded view largely corresponds to that shown in FIG. 1. Identical details have been given identical reference numbers. To that extent reference is made to the description of FIG. 1. It can be seen that as far as the outer joint part 1 and the inner joint part 2 are concerned that each two adjoining ball tracks 3l', 3l", 3r', 3r", 5r', 5r", 5l', 5l" extend parallel relative to one another. With a total of eight balls 6, the cage 7 comprises four circumferentially distributed cage windows 10 which each receive pairs of balls 6 guided in adjoining parallel ball tracks 3, 5. A joint journal 15 is attached to the base part 14.

Figure 2B:
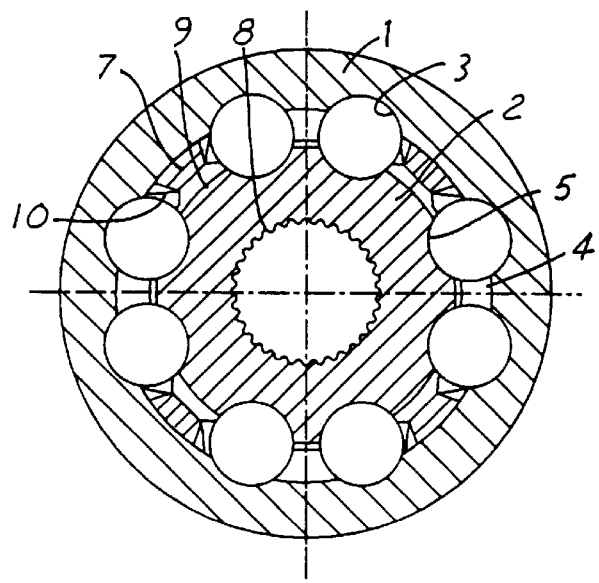
FIG. 2b is a cross-section through the assembled joint along line 2b—2b according to FIG. 1b.
Figure 2C:
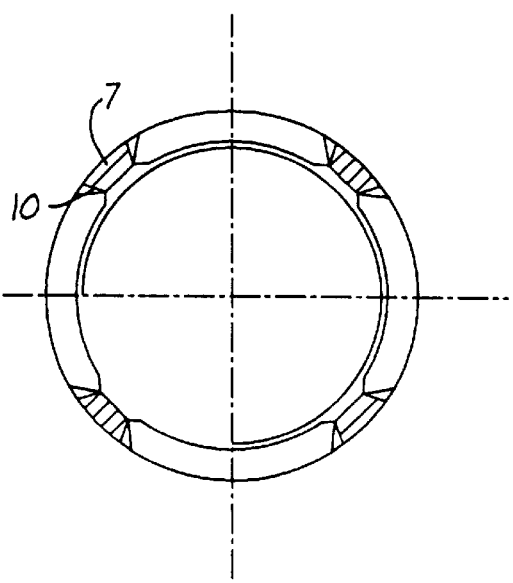

FIGS. 2b and 2c partly show the details referred to in connection with FIG. 2a in a cross-sectional view through the assembled joint and through the ball cage. Identical details have been given identical reference numbers.

Figure 3A:
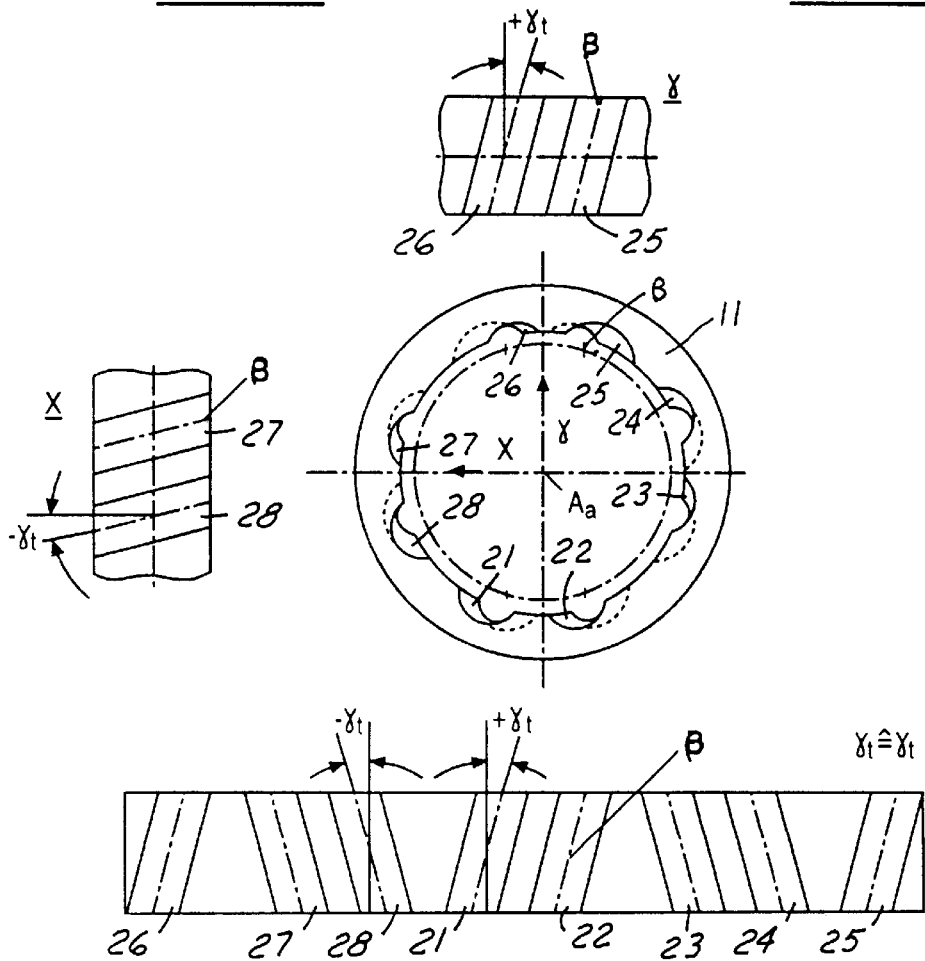
FIG. 3 shows an inner joint part and an outer joint part of an inventive plunging joint in a first embodiment
 a) is an axial view of the outer joint part with two partial views and a developed view of the tracks;
 b) an axial view of the inner joint with two partial views and a developed view of the tracks.
Figure 3B:
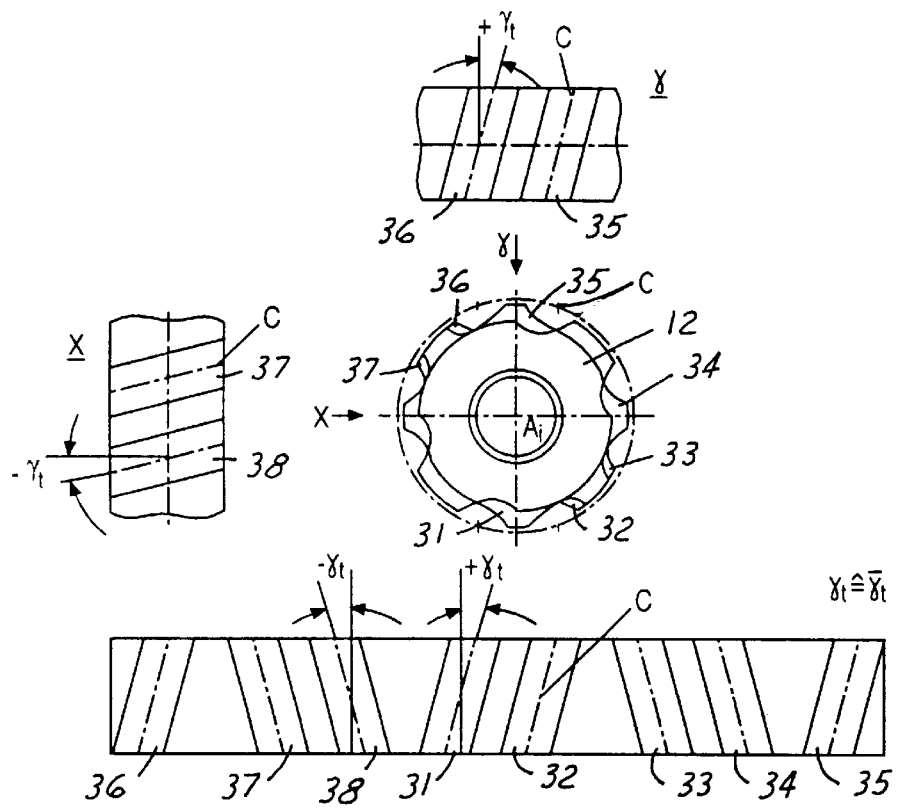

In FIG. 3 whose different illustrations will be described jointly below, FIG. 3a shows an outer joint part 11 and FIG. 3b an inner joint part 12 which each comprise eight ball tracks. In the outer joint part 11, the ball tracks have been given individual reference numbers 21 to 28 and in the outer joint part 12, the ball tracks carry reference numbers 31 to 38, both in the axial view and in the developed inner view. Each two tracks 21/22, 23/24, 25/26, 27/28 and 31/32, 33/34, 35/36, 37/38 respectively form a pair of tracks whose center lines extend parallel relative to one another. The partial views X and Y and the developed view show that each two adjoining pairs of tracks form a positive angle of intersection $+\gamma_t$ relative to the longitudinal direction on the one hand and a negative angle of intersection $-\gamma_t$ relative to the longitudinal direction of the joint on the other hand. The partial views X, Y correspond to the radial views characterized by arrows both at the outer joint part 11 and at the inner joint part 12. If one takes into account the directions of the respective views, this means that associated pairs of tracks in the outer joint part 11 and inner joint part 12, whose end numbers correspond to one another, intersect one another at opposed angles of intersection $+\gamma_t$, $-\gamma_t$. This also becomes clear in the axial views of the outer joint part 11 and of the inner joint part 12 which are shown in predetermined associated positions. The center lines of the two tracks of the individual pairs of tracks are positioned in one common plane which extends perpendicularly relative to one of the four radial directions shown. In consequence, the two tracks of one pair of tracks in each joint part 11, 12 can be formed and machined in one common production step.

Figure 4A:
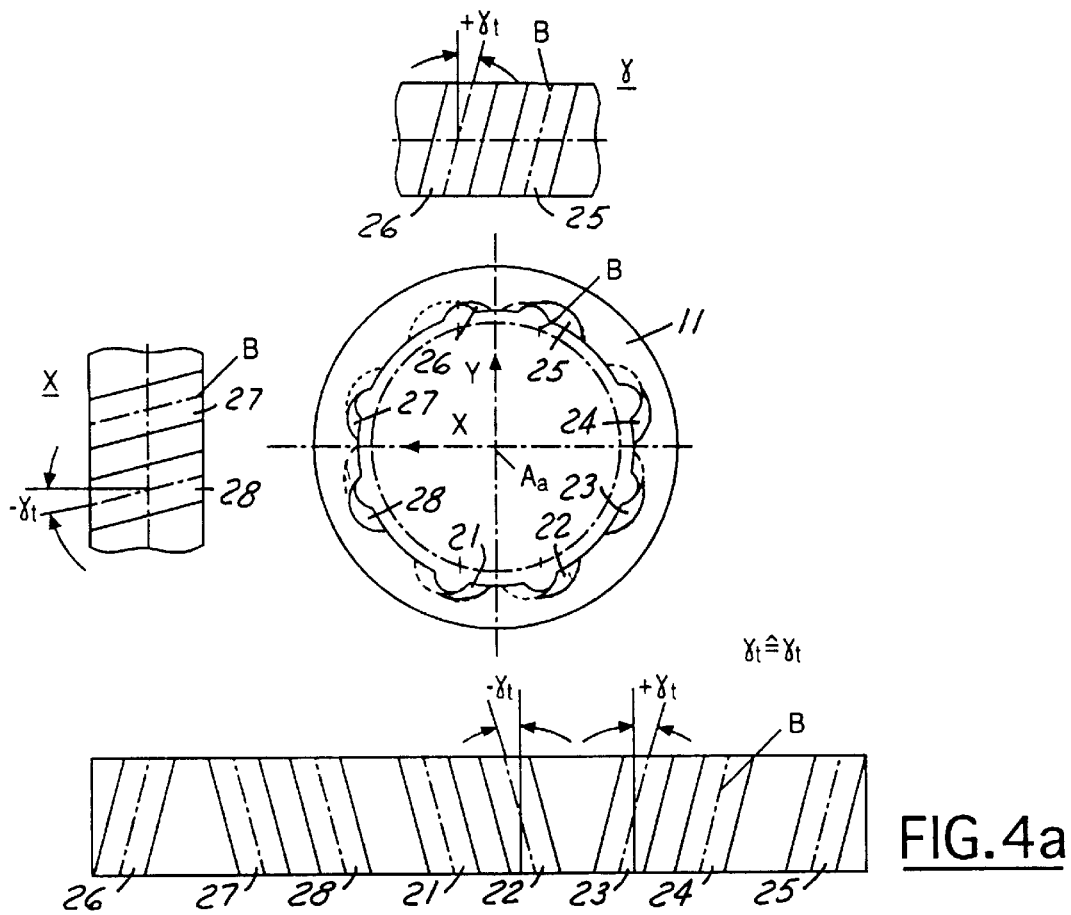
FIG. 4 shows an inner joint part and an outer joint part of an inventive plunging joint in a second embodiment
 a) an axial view of the outer joint part with two partial views and a developed view of the tracks;
 b) an axial view of the inner joint part with two partial views and a developed view of the tracks.
Figure 4B:
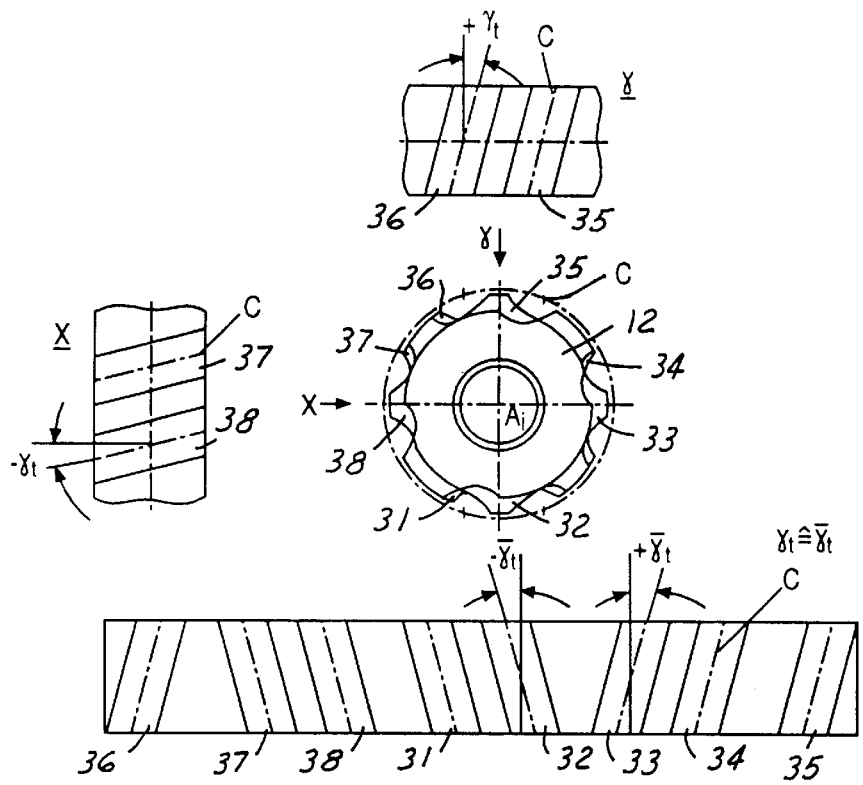

In FIG. 4 whose different illustrations will be described jointly hereafter, FIG. 4a shows an outer joint part 11 and FIG. 4b an inner joint part 12, they are both illustrated in the same way as in FIG. 1. FIG. 4 deviates from the embodiment according to FIG. 1, in that the center lines of the pairs of tracks 21/22 and 25/26 on the one hand and of the pairs of tracks 23/24 and 27/28 on the other hand are also parallel relative to one another. This can be seen in the axial view of the outer joint part 11 and of the inner joint part 12. As can also be seen in the developed view, this results in a groupwise arrangement in that there exists a first group of tracks pairs 21/22, 27/28 which, relative to the longitudinal direction, form a common negative angle of intersection $-\gamma_t$, and a second group of track pairs 23/24, 25/26, which, relative to the longitudinal direction, form a second positive angle of intersection $+\gamma_t$. This means that the center lines of the tracks of the pairs of tracks positioned radially opposite one another at the joint parts 11, 12 are also parallel relative to one another and can be formed and machined in a common production step. With eight tracks, each individual production step involving suitable quadruple tools thus only has to be carried out twice on each one of the joint parts 11, 12.

Figure 5A:
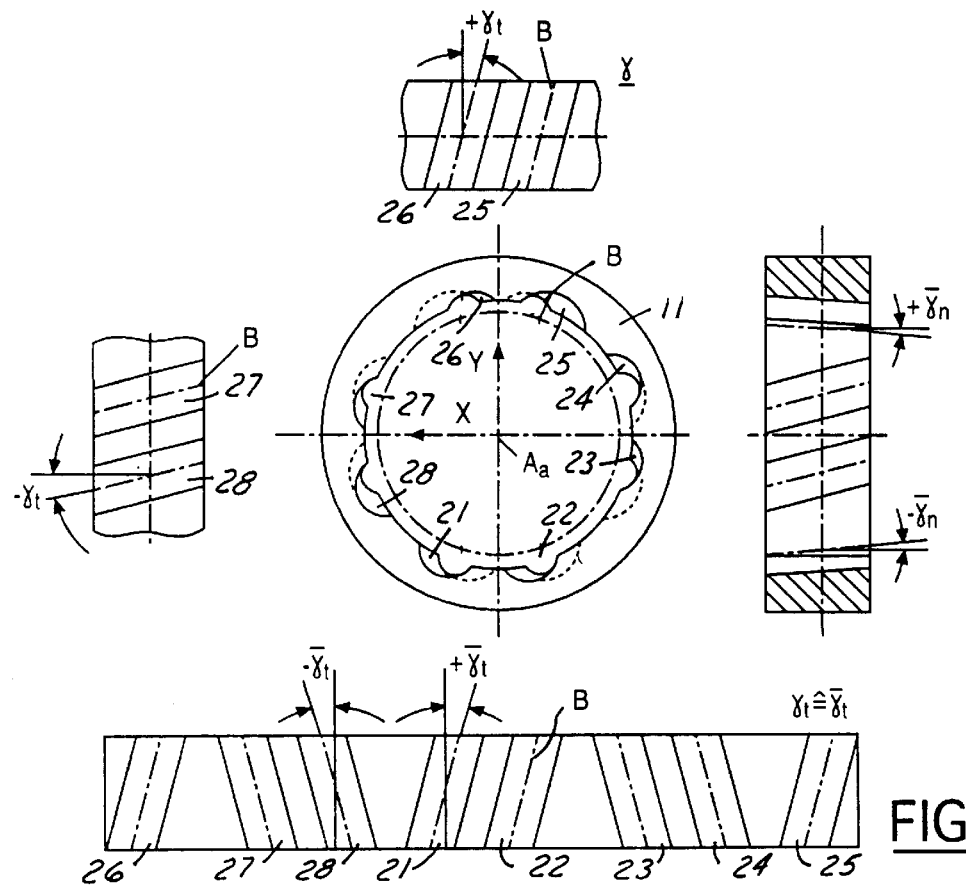
FIG. 5 shows an inner joint part and an outer joint part of an inventive plunging joint in a third embodiment
 a) an axial view of the outer joint part with two partial views, a developed view of the tracks and an approximately radial partial view;
 b) an axial view of the inner joint part with two partial views and a developed view of the tracks.
Figure 5B:
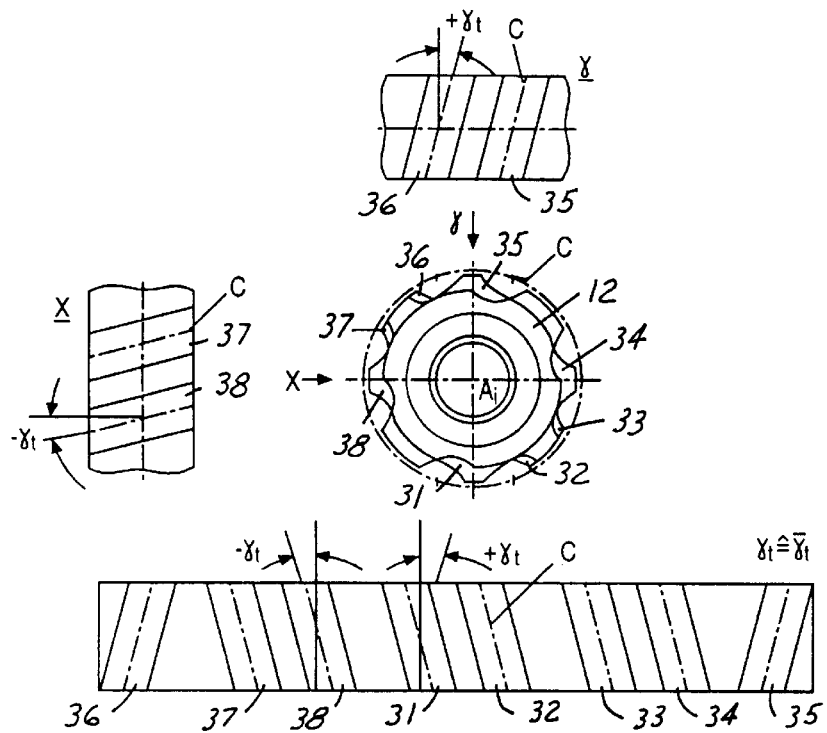

In FIG. 5 whose different illustrations will be described jointly hereafter, FIG. 5a shows an outer joint part 11 and FIG. 5b an inner joint part 12 in an embodiment which substantially corresponds to that shown in FIG. 3. To that extent, reference is made to the description of FIG. 3. As can be seen in FIG. 5a in the section A—A extending parallel to the Y-direction, the tracks, in addition to extending at the angle of intersection $+\gamma_t$, $-\gamma_t$, relative to the longitudinal direction in tangential planes, are also inclined at angles $+\gamma_n$, $-\gamma_n$ relative to the longitudinal direction in radial planes, with the latter angle leading to a variable track depth. In accordance with general principles, the track depth of the respective tracks in the inner joint part has to be changed in the respective opposite sense, i.e. the associated inner and outer tracks open "mouth-like" in an axial direction. All track pairs open "mouth-like" in the same axial direction.

Figure 6A:
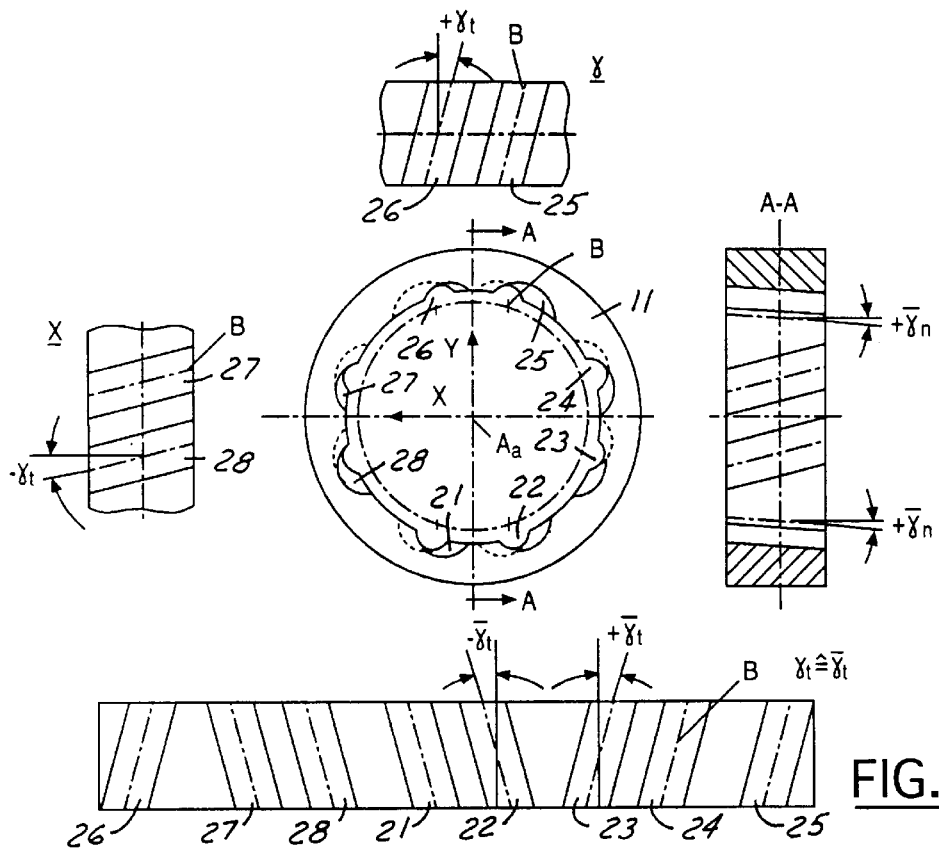
FIG. 6 shows an inner joint part and an outer joint part of an inventive plunging joint in a fourth embodiment
 a) an axial view of the outer joint part with two partial views, a developed view of the tracks and an approximately radial partial view;
 b) an axial view of the inner joint part with two partial views and a developed view of the tracks.
Figure 6B:
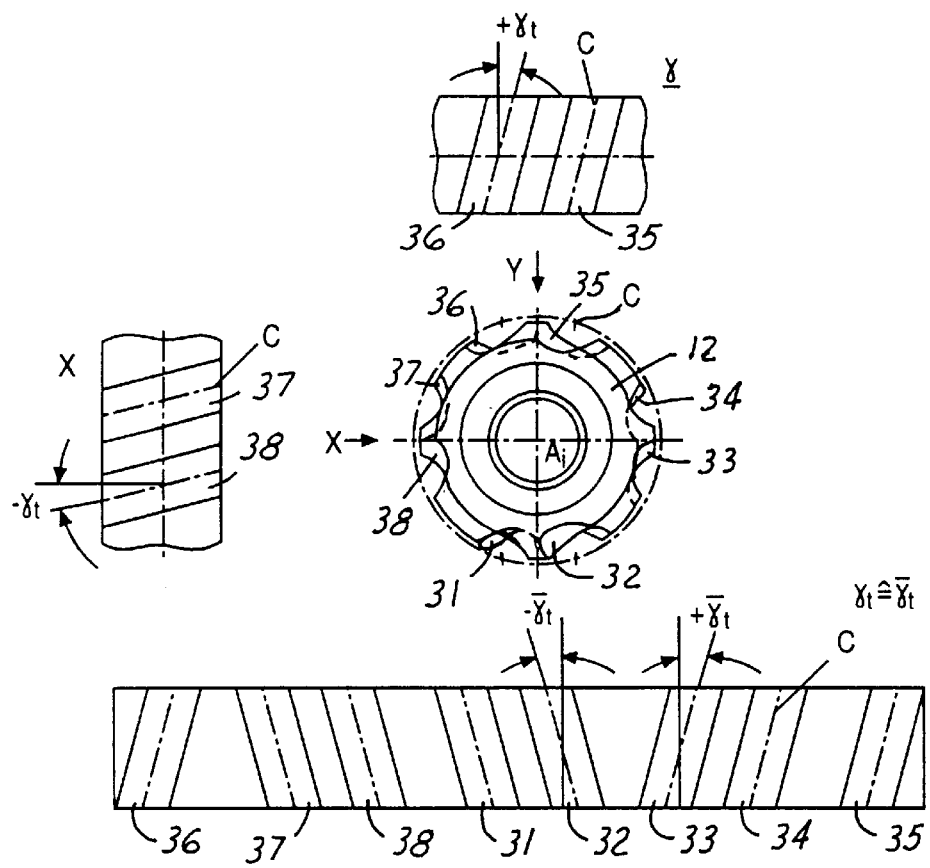

In FIG. 6 whose different illustrations will be described jointly hereafter, FIG. 6a shows an outer joint part 11 and FIG. 6b an inner joint part 12 which largely corresponds to that shown in FIG. 4. To that extent, reference is made to the description of FIG. 4 wherein, as in FIG. 6a, in section A—A positioned parallel relative to the Y-direction, the track depth of the tracks varies in that the center lines form an angle $\gamma_n$ relative to the longitudinal direction in radial planes. The track depth has to be provided in respective tracks in the outer joint part and in the opposite sense in the inner joint part. The opposed pairs of tracks 21/22, 25/26 on the one hand and 23/24, 27/28 on the other hand and respectively 31/32, 35/36 on the one hand and 33/34, 37/38 on the other hand, in this embodiment, comprise parallel center lines, so that in this case, too, machining operations concerning the tracks can be combined. In accordance with general principles, the track depth of the respective tracks in the inner joint part has to be changed in the respective opposite sense. This means that the tracks of opposed pairs of tracks form pairs of tracks which open mouth-like in opposite axial directions.

As far as all the developed views are concerned, it should be noted that the tracks are shown with a constant width, but in view of the parallel center lines of pairs of tracks which are offset in opposite senses relative to a radial plane, it is to be understood that inclined sections of a greater diameter cylinder with cylinders of a smaller diameter would not form straight edges, especially if the center lines additionally comprise an opening angle $\gamma_n$.

The following claims should be studied to determine the true scope of these inventions.

I claim:

1. A constant velocity universal ball joint comprising:
    a plunging joint having an outer joint part to be connected to a first drive part, and provided with an inner aperture in which there are formed outer ball tracks which extend at a first angle of intersection ($+\gamma_1$) relative to a longitudinal axis ($A_a$) of the outer joint part;
    an inner joint part to be connected to a second drive part, and which forms a hub member which is positioned in said inner aperture of said outer joint part and on which there are formed inner ball tracks which extend at a second angle of intersection ($-\gamma_t$) relative to a longitudinal axis ($A_i$) of said inner joint part;
    torque transmitting balls guided in said outer and inner ball tracks which are associated with one another in pairs, forming said angles of intersection ($+\gamma_t, -\gamma_t$), said tracks associated with one another in pairs being identical in size and set in opposite senses relative to said longitudinal axes ($A_a$, $A_i$);
    a ball cage arranged between said outer joint part and said inner joint part and which comprises circumferentially distributed cage windows in which said balls are held in a common plane and in which, when the joint is articulated, said balls are guided onto an angle-bisecting plane between the longitudinal axes ($A_a$, $A_i$) intersecting each other; and
    each two circumferentially adjoining ball tracks in said outer joint part comprise center lines (B) which extend parallel relative to one another in one plane and which form outer pairs of tracks and that each two circumferentially adjacent ball tracks in the inner joint part comprise center lines (C) which extend parallel relative to one another in one plane and which form inner pairs of tracks, with said respective outer and inner pairs of tracks being associated with one another and jointly receiving a pair of said balls.

2. A joint according to claim 1, wherein said ball cage comprises one common cage window for each pair of balls, which pair of balls is guided in said outer and inner pairs of tracks associated with one another.

3. A joint according to claim 2, wherein at said first angle of intersection ($+\gamma_t$) greater than or equal to 12°, the ball cage comprises one common cage window for each pair of balls.

4. A joint according to claim 1, wherein planes defined by the center lines (B, C) of respective ball tracks of each pair of tracks extend parallel to the longitudinal axis (A) of the respective joint parts and planes of the associated pairs of tracks in the outer joint part and inner joint part coincide.

5. A joint according to claim 1, wherein said planes defined by the center lines (B, C) of the respective ball tracks of each pair of tracks form an opening angle ($\gamma_n$) relative to the longitudinal axes ($A_{a'}$, $A_i$) of the respective joint parts such that the planes of the associated pairs of tracks in the inner joint part and in the outer joint part form first and second opening angles ($+\gamma_{n'}$, $-\gamma_n$) relative to the longitudinal axes ($A_{a'}$, $A_i$), which angles are of identical size, but are set in opposite senses.

6. A joint according to claim 5, wherein there is provided an even number of said outer and inner pairs of tracks and that the planes through the outer pairs of tracks and inner pairs of tracks which, with reference to the longitudinal axes ($A_a$, $A_i$) of one of the joint parts, are positioned radially opposite one another form a third opening angle ($2\gamma_n$) with one another, said third opening angle being twice said first and second opening angles.

7. A joint according to claim 5, wherein there is provided an even number of said outer and inner pairs of tracks and that the planes through the outer pairs of tracks and inner pairs of tracks which, with reference to the longitudinal axes ($A_a$, $A_i$) of one of the joint parts, are positioned radially opposite one another extend parallel relative to one another.

8. A joint according to claim 5, wherein the opening angles ($+\gamma_n$, $-\gamma_n$) ranges between 4° and 10°.

9. A joint according to claim 1, wherein there is provided an even number of said outer and inner pairs of tracks and that the center lines (B, C) of outer pairs of tracks and inner pairs of tracks which, with reference to the longitudinal axes ($A_{a'}$, $A_i$) of one of the joint parts are positioned radially opposite one another, form a third angle of intersection ($2\gamma_t$) with one another, said third angle of intersection being twice said first and second angles of intersection.

10. A joint according to claim 1, wherein there is provided an even number of outer and inner pairs of tracks and that the center lines (B, C) of said outer pairs of tracks and inner pairs of tracks which are positioned radially opposite one another with reference to the longitudinal axes ($A_a$, $A_i$) of one of the joint parts extend parallel relative to one another.

11. A joint according to claim 1, wherein the angles of intersection ($+\gamma_t$, $-\gamma_t$) range between 10° and 15°.

* * * * *